April 18, 1961 L. W. HUSSEY 2,980,863

RINGING TONE GENERATOR

Filed Aug. 5, 1958

INVENTOR
L. W. HUSSEY
BY Harold C. Herman
ATTORNEY 2,980,863
Patented Apr. 18, 1961

2,980,863

RINGING TONE GENERATOR

Luther W. Hussey, Sparta, N.J., assignor to Bell Telephone Laboratories, Incorporated, New York, N.Y., a corporation of New York Filed Aug. 5, 1958, Ser. No. 753,231

8 Claims. (Cl. 331—56)

Figure 1:
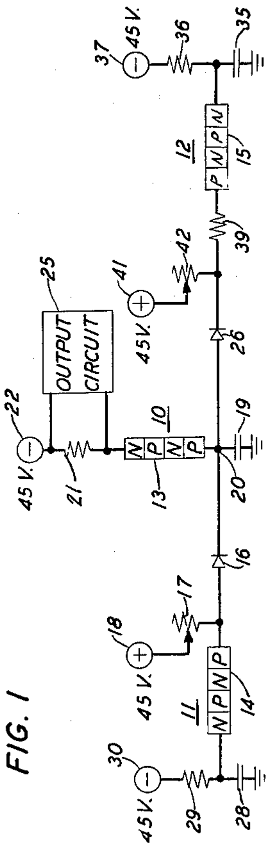

This invention relates to ringing tone generators and more particularly to such generators which utilize gated transistor oscillators for providing doubly interrupted ringing tone.

In conventional telephone systems the ringing signal is a singly interrupted audio tone. Each cycle of the single interrupted audio tone may, for example, consist of a two-second, twenty cycle per second tone followed by a four-second interruption or silent interval. In telephone systems where changes in service condition are determined by sequentially operated line scanners, it is inadvisable to provide continuous audio tone for an interval as long as two seconds because the audio tone interferes with the line scanner operation. In electronic telephone systems of the type disclosed in the pending patent applications Serial No. 622,926, filed by Brooks-Pfleger on November 19, 1956, and Serial No. 688,386, filed by Budlong-Drew-Harr on October 7, 1957, called subscriber lines are sampled every one-tenth of a second in order to detect subscriber answer.

It is an object of this invention to provide a doubly interrupted ringing tone for use in telephone systems utilizing line scanners for determining changes in service condition.

The doubly interrupted ringing signal has a tone interval and a main interruption interval which may be the same in duration as the tone and interruption intervals of a singly interrupted ringing signal. During the tone interval of each ringing cycle, however, a number of short or secondary interruption intervals are provided during which the service condition of the line is sampled.

Another object of this invention is to provide an improved ringing tone generator which is relatively simple, small and compact for providing a complex pulse output consisting of a doubly interrupted tone.

Still another object of this invention is to provide a ringing tone generator for supplying a doubly interrupted tone wherein the two interruption intervals may be independently adjusted without varying the frequency of the tone or the frequency of the two interruptions.

These objects are attained in one specific illustrative embodiment of the present invention which includes three oscillator stages. Each of the oscillator stages has a four-layer junction transistor of the type disclosed in the pending patent application Serial No. 548,330, filed by W. Shockley on November 22, 1955, now Patent 2,855,524, issued on October 7, 1958.

A feature of this invention relates to the utilization of two of the oscillator stages to jointly control the duration of oscillation of the third oscillator stage. All three stages oscillate at different frequencies.

Another feature of this invention pertains to the provision of a doubly gated audio oscillator which oscillates only when one of its gates is open and the other of its gates is closed. The doubly gated oscillator, which is the third or controlled stage, includes a timing capacitor that is charged through a first diode and discharged through a PNPN junction transistor controlled by the capacitor. The output of the generator is taken from an impedance element serially connected with the PNPN transistor. One of the two control stages or oscillators periodically forward biases the first diode to complete the charging path for the capacitor. The other of the two control oscillators is connected by a second diode to the timing capacitor in the doubly gated oscillator. The second diode is periodically forward biased to effectively provide another discharge path for the timing capacitor and thereby inhibit the operation of the PNPN junction transistor.

Still another feature of this invention relates to the provision of gating means jointly controlled by a relatively intermediate frequency oscillator and by a relatively low frequency oscillator for starting and stopping the operation of a relatively high frequency oscillator.

A further feature of this invention pertains to the provision of means for independently adjusting the two interruption intervals without varying the interruption frequencies or the frequency of the third or gated oscillator.

Still another feature of this invention pertains to the utilization of PNPN transistors in oscillators wherein the potential changes are slow enough to maintain the transistor breakdown potentials at substantial levels.

Still another feature of this invention relates to the interconnection of three four-layer junction transistors in a pulse generator wherein each of the transistors is part of a different frequency oscillator in a manner such that an output is provided only when a predetermined combination of the transistors is conductive.

Figure 2:
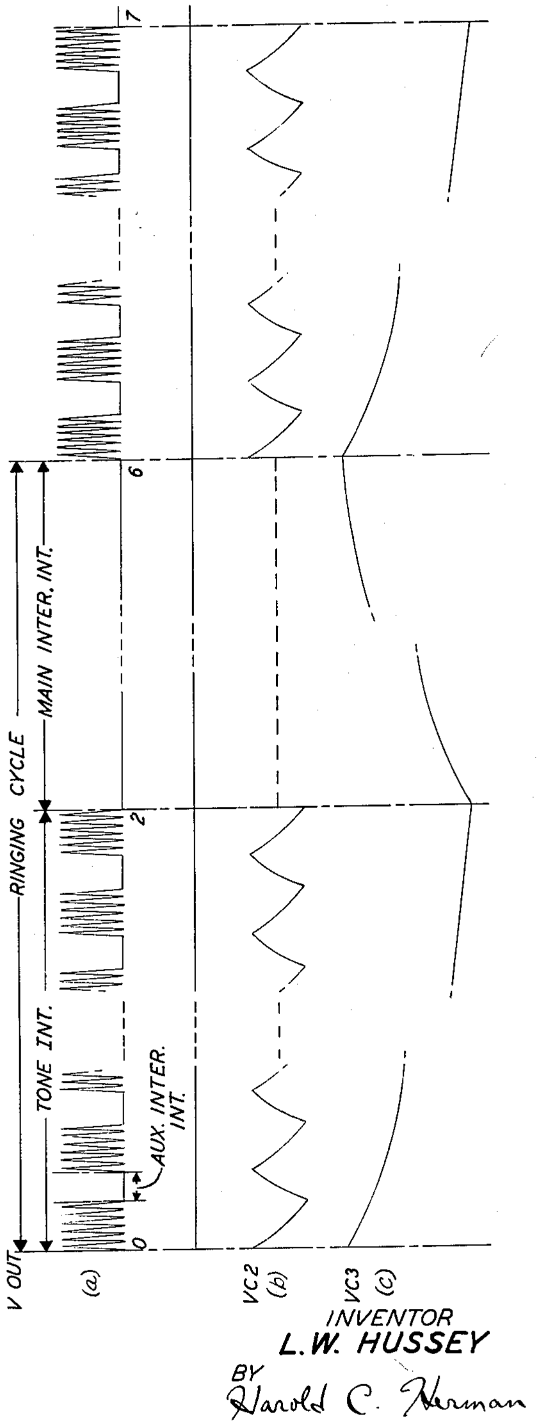

Further objects and features of this invention will become apparent upon consideration of the following description read in conjunction with the drawing wherein:

Fig. 1 is a circuit representation of the specific embodiment of the doubly interrupted ringing tone generator of this invention; and Fig. 2 is a series of curves illustrating the operation of the generator shown in Fig. 1.

Referring to Fig. 1 an audio oscillator or stage 10 is controlled by two interruption oscillators or stages 11 and 12. Each of the three stages 10, 11 and 12 oscillates at a different frequency with the stage 10 oscillating at the highest frequency and the stage 12 at the lowest frequency. The oscillator stages 10, 11 and 12 include, respectively, the four-layer transistors 13, 14 and 15 of the type described in the above-identified disclosure by W. Shockley. The PNPN transistors 13, 14 and 15 have a high impedance state of approximately 100 megohms until the voltage thereacross reaches approximately 50 volts. Thereafter the transistors 13, 14 and 15 assume a very low impedance of a few ohms as long as the current is as great as the minimum sustaining value of approximately 10 microamperes.

Assuming that all three transistors 13, 14 and 15 are nonconductive or in their high impedance state, a diode 16 in the oscillator stage 10 is forward biased due to its connection through the rheostat 17 to the positive potential source 18. The diode 16 and the rheostat 17 are part of the charging path for a grounded timing capacitor 19 which controls the oscillating frequency of the stage 10. The potential across the capacitor 19, which is at point 20, is applied to the external P layer of the transistor 13. The external N layer of the transistor 13 is connected through a resistor 21 to a negative potential source 22. The capacitor 19 continues to charge until the potential at point 20 reaches plus 5 volts. With plus 5 volts at point 20 and minus 45 volts at the external N layer of the transistor 13, the transistor 13 breaks down or becomes conductive.

When the transistor 13 becomes conductive, it assumes its low impedance condition causing the potential at point 20 to decrease under control of the capacitor 19. The potential at point 20 decreases because the impedance ratio of rheostat 17 to resistor 21 is large enough to cause the charge to leave the capacitor 19 at a rate faster than it is applied from battery 18 through the diode 16. When the current through the transistor 13 decreases below the minimum sustaining current of the transistor 13, it becomes non-conductive and the cycle is repeated. The capacitor 19 cyclically charges through the diode 16 and discharges through the transistor 13 at an audio rate. The audio tone is provided to an output circuit 25 connected across the resistor 21. The output circuit 25 may be any circuit arrangement including telephone lines, switching equipment, etc. for receiving a doubly interrupted ringing tone.

As long as the diode 16 remains forward biased and a diode 26, which is also connected at point 20 to the capacitor 19, remains reverse biased, the oscillator stage 10 provides an audio tone to the circuit 25. The diode 16 is, however, periodically reverse biased under control of the oscillator stage 11. With the transistor 14 in the oscillator stage 11 in its high impedance state, a grounded capacitor 28 is negatively charged over a path through a resistor 29 from a negative potential source 30. The capacitor 28 is connected to the external N layer of the transistor 14. The P layer of the transistor 14 is connected to the junction of the varistor 16 and the rheostat 17. When the potential across the transistor 14 reaches the transistor 14 reaches the transistor breakdown potential, it becomes conductive assuming its low impedance state. With the transistor 14 in its conductive condition or low impedance state, the potential at the anode of the diode 16 is reduced and the diode 16 becomes reverse biased. The diode 16 is reverse biased independent of the conductive condition of the transistor 13 in the oscillator stage 10. In this manner the oscillator stage 10 is inhibited and the tone provided to the output circuit 25 interrupted or halted under control of the oscillator stage 11. The current through the transistor 14 decreases under control of the capacitor 28 until the minimum sustaining current of transistor 14 is attained. When the minimum sustaining current is reached, transistor 14 becomes nonconductive to forward bias the diode 16 and allow the capacitor 19 again to charge. The diode 16 is in this manner cyclically forward biased and then reverse biased under control of the stage 11. The potential change across the capacitor 28 is shown in Fig. 2 curve *b* and the output ringing signal across the output resistor 21 is shown in Fig. 2 curve *a*. Each ringing cycle includes a tone interval during which the tone is periodically interrupted by the oscillator stage 11 and a main interruption interval which is hereinafter described.

The oscillator stage 10 provides the audio tone to the circuit 25 during the time the diode 16 is forward biased under control of the oscillator stage 11 as long as the diode 26 is reversed biased by the oscillator stage 12. With the transistor 15 in the oscillator stage 12 in its high impedance state, a grounded capacitor 35 is negatively charged over a path through a resistor 36 to a negative battery 37. The external P layer of the transistor 15 is connected through a resistor 39 to the cathode of the diode 26 and also to a positive potential source 41 through a resistor 42.

As the capacitor 35 charges negatively the potential across the transistor 15 increases. When the potential across the transistor 15 reaches the transistor breakdown potential it assumes its low impedance state decreasing the potential at the cathode of the diode 26 causing it to be forward biased. With diode 26 forward biased, an additional and relatively low impedance discharge path is provided for the timing capacitor 19 in the oscillator stage 10. Current is provided from the capacitor 19 through the forward biased varistor 26, the resistor 39 and the now low impedance transistor 15 to the grounded capacitor 35. As soon as the transistor 15 becomes conductive, therefore, the capacitor 35 discharges over a path through the transistor 15 to battery 41 and also to the capacitor 19. When the current through the transistor 15 decreases to the minimum transistor sustaining current, transistor 15 assumes its high impedance condition effectively opening the discharge path for capacitor 35. In this manner, under control of the oscillator stage 12, the diode 26 is periodically forward and reversed biased. With the diode 26 forward biased the charge on the capacitor 19 is dissipated through resistor 39 and it is impossible for the transistor 13 to assume its low impedance state. The transistor 13 in the output stage 10 cannot become conductive as long as the diode 26 is forward biased independent of the condition of the diode 16. If the diode 16 is forward biased an additional discharge path is provided for the capacitor 35 from the battery 18 through rheostat 17 and the diode 16.

The potential across the capacitor 35 is illustrated as curve *c* in Fig. 2. As illustrated therein the duration of the cycle of stage 12 determines the duration of the ringing cycle shown in curve *a* of Fig. 2. In one specific embodiment of the invention, the oscillator stage 12 has a six-second cycle with the transistor 15 being in its high impedance state for two seconds and its low impedance state for four seconds. During the four-second interval when transistor 15 is conductive, the oscillator stage 10 is inhibited and the audio tone to the circuit 25 is interrupted independent of the condition of the oscillator stage 11. The oscillator stage 11 has a one-tenth of a second cycle with the transistor 14 being conductive for .04 second. In this manner, as illustrated in Fig. 2, a doubly interrupted audio tone is provided with each cycle including a tone interval interrupted by the oscillator stage 11 every one-tenth of a second and also a main interruption interval.

The duration of the auxiliary interruption interval which occurs every one-tenth of a second under control of the oscillator stage 11 may be varied by adjusting the rheostat 17. As the impedance presented by the rheostat 17 is increased from, for example, 80 kilohms to 140 kilohms, the interruption frequency of the oscillator 11 remains effectively constant while the percent interruption or inhibition by the stage 11 increases from approximately 20 percent to 50 percent. Not only does the interruption frequency of the oscillator 11 remain effectively constant but the audio tone or oscillating frequency of the stage 10 also remains effectively constant. The frequency of the audio tone and of the auxiliary interruption remains constant because in each of the oscillator stages 10 and 11 the adjustment of the rheostat 17 provides for two counteracting effects with regards to the frequency. For example, in the output stage 10 when the impedance presented by the rheostat 17 is made smaller, the charging current for the capacitor 19 is increased to reduce the interval for charging the capacitor 19 to the same voltage and the discharge time of the capacitor 19 is increased because more current is supplied thereto from the source 18. In this manner, though the capacitor 19 charges to the same voltage at a faster rate to tend to increase the frequency, it discharges at a slower rate tending to decrease the frequency. The frequency of the audio tone therefore remains effectively the same because of these two counteracting effects. In the interruption stage 11 two similar counteracting effects take place when the rheostat 17 is adjusted which maintains the interruption frequency at a constant value through the percent interruption changes. When the rheostat 17 presents a smaller impedance the capacitor 28 discharges at a faster rate. Due to the increase in current through the rheostat 17, however, during the charging and discharging cycle of the capacitor 19, the voltage drop across the rheostat 17 is larger so that the potential at the capacitor 28 must be larger in order to break down the transistor 14. The requirement of a larger potential across the capacitor 28 tends to increase the charging time of the capacitor 28. In this manner a reduction of the impedance presented by the rheostat 17 causes a reduction in the auxiliary interruption interval because the discharge time for the capacitor 28 is reduced. The frequency of the interruption interval, however, remains constant because the charging time for the capacitor 28 is increased.

In a similar manner when the impedance presented by the rheostat 42 is varied, the percent interruption provided by the oscillator stage 12 is adjusted.

It is to be understood that the above-described arrangements are illustrative of the application of the principles of this invention. Numerous other arrangements may be devised by those skilled in the art without departing from the spirit and scope of the invention.

What is claimed is:

1. A pulse generator comprising a relatively high frequency oscillator having a capacitor, a two-state transistor device connected to and controlled by the charge on said capacitor for discharging said capacitor, means serially connected to said transistor device for providing an output from said generator, and circuit means including a first asymmetrically conducting impedance element connected to said capacitor for charging said capacitor; means connected to said first asymmetrically conducting impedance element for inhibiting the conduction thereof at an intermediate frequency; and means for discharging said capacitor at a low frequency including a second asymmetrically conducting impedance element connected to said capacitor, and means connected to said second asymmetrically conducting impedance element for inhibiting the conduction thereof at said low frequency.

2. In combination, a gated oscillator including a two-state two-terminal transistor device having a first and a second terminal, an output circuit connected to said first terminal, a timing capacitor connected to said second terminal, and first and second asymmetrically conducting impedance devices connected to said second terminal, said first asymmetrically conducting impedance device being poled to permit easy current flow to said capacitor, said second asymmetrically conducting impedance device being poled to permit easy current flow from said capacitor, means connected to said first device for normally forward biasing said first asymmetrically conducting impedance device, means connected to said first device for periodically reverse biasing said first asymmetrically conducting impedance device, means connected to said second device for normally reverse biasing said second asymmetrically conducting impedance device, and means connected to said second device for periodically forward biasing said second asymmetrically conducting impedance device.

3. In combination, an output oscillator stage comprising a two-terminal transistor device having a conductive and a nonconductive condition, output circuit means connected to one terminal of said transistor device, a timing capacitor connected to the other terminal of said transistor device for controlling the potential across said transistor device and across said output circuit means, a discharge path for said timing capacitor including said transistor device and said output circuit means when said transistor device is in said conductive condition, and a serially-arranged charging path for said timing capacitor for causing said capacitor to charge to a potential sufficient to cause said transistor device to assume said conductive condition, said charging path including a potential source, a resistive element, and a varistor connected to said capacitor poled in the direction of easy current flow to said capacitor; and an interruption oscillator stage for controlling the duration of oscillation of said output oscillator stage comprising a two-terminal transistor device having one terminal connected to said varistor and to said resistive element whereby said resistive element and said potential source form part of said interruption stage as well as said output stage, a timing capacitor connected to the other terminal of said interruption stage transistor device for controlling the potential across said interruption stage transistor device and the biasing potential applied to said varistor, and a charging path for said timing capacitor of said interruption stage.

4. In combination in accordance with claim 3 in addition another varistor connected to said capacitor of said output stage, and another interruption oscillator stage connected to said another varistor for periodically forward biasing said another varistor to discharge said output stage capacitor and thereby to prevent said output stage transistor device from assuming said conductive condition.

5. A pulse generator comprising a relatively high frequency oscillator having a capacitor, a two-state transistor device controlled by said capacitor for discharging said capacitor and for providing an output from said generator, and circuit means including a first asymmetrically conducting impedance element for charging said capacitor; an intermediate frequency oscillator for controlling the biasing of said first asymmetrically conducting impedance element to periodically inhibit charging said capacitor; a relatively low frequency oscillator; and a second asymmetrically conducting impedance element connecting said capacitor to said low frequency oscillator whereby an additional discharge path is periodically established for said capacitor by said low frequency oscillator, said circuit means of said high frequency oscillator including an adjustable impedance element for adjusting the percent interruption by said intermediate frequency oscillator without changing the frequency of said low, said intermediate and said high frequency oscillators.

6. A pulse generator comprising a relatively high frequency oscillator including a first four-layer PNPN junction transistor, a first timing capacitor connected to said first transistor, an asymmetrically conducting impedance element connected between said first transistor and said capacitor, and a potential source connected to said asymmetrically conducting impedance element for normally maintaining said asymmetrically conducting impedance element forward biased; and means including a relatively low frequency oscillator connected to said asymmetrically conducting impedance element for periodically reverse biasing said asymmetrically conducting impedance element whereby the operation of said high frequency oscillator is periodically inhibited at said low frequency.

7. A pulse generator in accordance with claim 6 wherein said low frequency oscillator includes a second four-layer PNPN junction transistor connected to said asymmetrically conducting impedance element, and a second timing capacitor connected to said second transistor; and further including an adjustable impedance means connecting said first timing capacitor to said potential source for varying the percent inhibition of said high frequency oscillator without changing the operating frequencies of said high and said low frequency oscillators.

8. A pulse generator in accordance with claim 7 comprising in addition another oscillator having an oscillating frequency smaller than said low frequency oscillator, and a second asymmetrically conducting impedance element connected between said first timing capacitor and said another oscillator in a manner to be periodically forward biased by said another oscillator.

References Cited in the file of this patent

UNITED STATES PATENTS

| | | |
|---|---|---|
| 2,140,840 | Langer et al. | Dec. 20, 1938 |
| 2,460,637 | Huge | Feb. 1, 1949 |
| 2,761,909 | Wallace | Sept. 4, 1956 |